US011740875B2

(12) United States Patent
Abdelaziz et al.

(10) Patent No.: US 11,740,875 B2
(45) Date of Patent: Aug. 29, 2023

(54) TYPE INFERENCE IN DYNAMIC LANGUAGES

(71) Applicant: International Business Machines Corporation, Armonk, NY (US)

(72) Inventors: Ibrahim Abdelaziz, Tarrytown, NY (US); Julian Timothy Dolby, Bronx, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 17/382,324

(22) Filed: Jul. 21, 2021

(65) Prior Publication Data

US 2023/0029250 A1    Jan. 26, 2023

(51) Int. Cl.
| | |
|---|---|
| *G06F 9/44* | (2018.01) |
| *G06F 8/30* | (2018.01) |
| *G06F 8/75* | (2018.01) |
| *G06F 8/73* | (2018.01) |
| *G06F 16/903* | (2019.01) |
| *G06N 5/04* | (2023.01) |

(Continued)

(52) U.S. Cl.
CPC .................. *G06F 8/31* (2013.01); *G06F 8/73* (2013.01); *G06F 8/75* (2013.01); *G06F 16/901* (2019.01); *G06F 16/90335* (2019.01); *G06N 3/08* (2013.01); *G06N 5/04* (2013.01)

(58) Field of Classification Search
CPC ..... G06F 8/31; G06F 8/73; G06F 8/75; G06F 16/901; G06F 16/90335; G06N 3/08; G06N 5/04

USPC ............................ 717/114, 141–144; 706/15
See application file for complete search history.

(56) References Cited

U.S. PATENT DOCUMENTS 7,970,730 B2 * 6/2011 Meijer ...................... G06F 8/30
707/604
8,407,667 B2    3/2013 Stenberg
(Continued)

OTHER PUBLICATIONS

Aiken et al., "Static Type Inference in a Dynamically Typed Language", 1990, ACM, pp. 279-290. (Year: 1990).*
(Continued)

*Primary Examiner* — Ted T. Vo
(74) *Attorney, Agent, or Firm* — Caleb Wilkes; Otterstedt & Kammer PLLC

(57) ABSTRACT

To improve the technological process of programming a computer using a dynamic programming language, generate a first portion of training data which maps types in the dynamic programming language to corresponding functions and methods by performing information retrieval on documentation libraries in the dynamic programming language and/or generate a second portion of training data which maps program variables to the corresponding functions and methods by performing data flow analysis on a plurality of pre-existing programs written in the dynamic programming language. Train a neural network on the first and/or second portions of training data to infer unknown types in the dynamic programming language. Carry out inference with the trained neural network to infer the unknown types. Facilitate programming in the dynamic programming language based on the inferred unknown types. Optionally, execute a resulting program.

20 Claims, 18 Drawing Sheets

```
Algorithm 1 Docstring extraction algorithm
1:  procedure EXTRACT(I)            ▷ The list of modules
2:      C ← new set                  ▷ set of all classes
3:      for each m in I do
4:          If ← inspect(m)           ▷ list of methods
5:          for each f in If do
6:              add f.class to C
7:              r ← inspect(f)        ▷ inspect function
8:              t ← parse(r)          ▷ Sphinx to parse text
9:              d ← new JSON          ▷ doc for ElasticSearch
10:             d.function ← f
11:             d.content ← t
12:             index(d)              ▷ ElasticSearch index
13:         end for
14:     end for
15:     for each c in C do
16:         Id ← search(c)            ▷ search for all mentions of c
17:         for each d in Id do
18:             d.rettype ← c
19:         end for
20:     end for
21: end procedure
```

(51) Int. Cl.
  *G06F 16/901* (2019.01)
  *G06N 3/08* (2023.01)

(56) References Cited

U.S. PATENT DOCUMENTS

| | | | | |
|---|---|---|---|---|
| 8,555,250 | B2* | 10/2013 | Fanning | G06F 11/3604 |
| | | | | 717/114 |
| 8,595,213 | B2* | 11/2013 | Schaefer | G06F 8/437 |
| | | | | 707/713 |
| 9,372,637 | B1* | 6/2016 | Alatorre | G06N 5/04 |
| 9,652,207 | B2 | 5/2017 | Hoban | |
| 11,200,143 | B2* | 12/2021 | Jones | G06F 8/433 |
| 2006/0048095 | A1 | 3/2006 | Meijer | |

OTHER PUBLICATIONS

Hellendoorn et al., "Deep Learning Type Inference", 2018, ACM, pp. 152-162. (Year: 2018).*
Allamanis et al., "Typilus: Neural Type Hints", 2020, ACM, pp. 91-105. (Year: 2020).*
Saifullah et al., "Exploring Type Inference Techniques of Dynamically Typed Languages", 2020, IEEE, pp. 70-80. (Year: 2020).*
Haupt et al., . "Type Harvesting." SAC'11 Mar. 21-25, 2011, TaiChung, Taiwan (2011), 8 Pages.
Lagorio et al., . "Just: safe unknown types in Java-like languages." Journal of Object Technology 6.2 2007 30 pages.
Marot et al., "Fast Type Reconstruction for Dynamically Typed Programming Languages." DLS'09, Oct. 26, 2009, Orlando, Florida, USA. (2009). 10 pages.
Meijer et al., "Static typing where possible, dynamic typing when needed: The end of the cold war between programming languages." OOPSLA, 2004 6 pages.
Rodriguez, "Improving the Runtime Performance and Robustness of Hybrid Statically and Dynamically Typing Languages" Diss (2013) 123 pages.
Spoon et al., "Demand-driven type inference with subgoal pruning: Trading precision for scalability." European Conference on Object-Oriented Programming. Springer, Berlin, Heidelberg, 2004 24 pages.
Peter Mell and Timothy Grance, The NIST Definition of Cloud Computing, NIST Special Publication 800-145, cover, pp. i-iii, 1-3, Sep. 2011.
[1] Miltiadis Allamanis, Earl T Barr, Soline Ducousso, and Zheng Gao. 2020. Typilus: neural type hints. In Proceedings of the 41st acm sigplan conference on programming language design and implementation. 91-105. Apr. 6, 2020.
[2] Julian Dolby, Avraham Shinnar, Allison Allain, and Jenna Reinen. 2018. Ariadne: Analysis for Machine Learning Programs. In Workshop on Machine Learning and Programming Languages (MAPL). 1-10. http://doi.acm.org/10.1145/3211346. 3211349 May 10, 2018.
[3] Levin Fritz and Jurriaan Hage. 2017. Cost versus Precision for Approximate Typing for Python. In Workshop on Partial Evaluation and Program Manipulation (PEPM). 89-98. https://doi.org/10.1145/3018882.3018888 2014.
[4] J. Lehtosalo G. van Rossum and L. Langa. [n.d.]. PEP484: Type Hints. https://www.python.org/dev/peps/pep-0484/. [Online; accessed Apr. 2, 2023, created Sep. 29, 2014 Latest Post May 22, 2015 33 Pages.
Wikipedia, Java (programming language), downloaded Apr. 2, 2023 from https://en.wikipedia.org/wiki/Java (programming_language) last modified last edited on Mar. 22, 2023 22 pages.
[6] Mostafa Hassan, Caterina Urban, Marco Eilers, and Peter Müller. 2018. MaxSMT—Based Type Inference for Python 3. In Conference on Computer Aided Verification (CAV). 12-19. https://doi.org/10.1007/978-3-319-96142-2_2 2018.
[7] Vincent J Hellendoorn, Christian Bird, Earl T Barr, and Miltiadis Allamanis. 2018. Deep learning type inference. In Proceedings of the 2018 26th acm joint meeting on european software engineering conference and symposium on the foundations of software engineering. 152-162.
[8] Eva Maia, Nelma Moreira, and Rogério Reis. 2011. A Static Type Inference for Python. In Workshop on Dynamic Languages and Applications (DYLA). http://scg.unibe.ch/download/dyla/2011/dyla11_submission_3.pdf 5 pages.
[9] Rabee Sohail Malik, Jibesh Patra, and Michael Pradel. 2019. NL2Type: inferring JavaScript function types from natural language information. In 2019 IEEE/ACM 41st International Conference on Software Engineering (ICSE). IEEE, 304-315.
[10] Robin Milner, Mads Tofte, and David Macqueen. 1997. The Definition of Standard ML. MIT Press, Cambridge, MA, USA. 136 pages.
[11] Michael Pradel, Georgios Gousios, Jason Liu, and Satish Chandra. 2020. Type-writer: Neural type prediction with search-based validation. In Proceedings of the 28th ACM Joint Meeting on European Software Engineering Conference and Symposium on the Foundations of Software Engineering. 209-220. Mar. 6, 2020.
[12] Ingkarat Rak-amnouykit, Daniel McCrevan, Ana Milanova, Martin Hirzel, and Julian Dolby. 2020. Python 3 Types in the Wild: A Tale of Two Type Systems. Association for Computing Machinery, New York, NY, USA, 57-70. https://doi. org/10.1145/3426422. 3426981 Nov. 17, 2020.
Sulzmann, Martin, Martin Muller, and Christoph Zenger. "Hindley/Milner style type systems in constraint form." Res. Rep. ACRC-99-009, University of South Australia, School of Computer and Information Science (1999). 12 pages.
[14] Zhaogui Xu, Xiangyu Zhang, Lin Chen, Kexin Pei, and Baowen Xu. 2016. Python Probabilistic Type Inference with Natural Language Support. In Foundations of Software Engineering (FSE). 607-618. http://doi.acm.org/10.1145/2950290.2950343 Nov. 13, 2016.

* cited by examiner

```
1   import pandas # import
2
3   # massage data
4   def massage_data(dta):
5       dta.dropna(inplace=True)
6       dta.drop([149], inplace=True) # bad line
7       return dta
8   #end
9
10  data = pandas.read_csv("iris.data")
11  data = massage_data(data)
12  if len(data) > 10:
13      sample = data.head(n = 10)
14  else:
15      sample = data
16  print(sample)
```
⎱ 101

Running Example

```
1   import pandas as pd
2
3   test_df = pd.read_csv('test.csv')
4   test_df.to_csv('mod_data.csv')
```
⎱ 103

Another Script

```
"""
Returns
DataFrame or TextParser
A comma-separated values (csv) file I
s returned as two-dimensional data
structure with labeled axes.
"""
```
⎱ 105 read_csv documentation

*FIG.2*

| Class | Aliases To |
|---|---|
| statsmodels.datasets.utils.DataFrame | pandas.core.frame.DataFrame |
| statsmodels.stats.anova.DataFrame | pandas.core.frame.DataFrame |
| bokeh.core.properties.PandasDataFrame | bokeh.core.property.pandas.PandasDataFrame |
| bokeh.core.properties.PandasDataFrame | bokeh.core.property.pandas.PandasDataFrame |

FIG. 3

Algorithm 1 Docstring extraction algorithm

```
1:  procedure EXTRACT(l)                    ▷ The list of modules
2:      C ← new set                         ▷ set of all classes
3:      for each m in l do
4:          lf ← inspect(m)                 ▷ list of methods
5:          for each f in lf do
6:              add f.class to C
7:              r ← inspect(f)              ▷ inspect function
8:              t ← parse(r)                ▷ Sphinx to parse text
9:              d ← new JSON                ▷ doc for ElasticSearch
10:             d.function ← f
11:             d.content ← t
12:             index(d)                    ▷ ElasticSearch index
13:         end for
14:     end for
15:     for each c in C do
16:         ld ← search(c)                  ▷ search for all mentions of c
17:         for each d in ld do
18:             d.rettype ← c
19:         end for
20:     end for
21: end procedure
```

FIG.5

```
1    ... initialization code ...
2    v40 = invokestatic <Lpandas, import()Lpandas;>                              s.py [2:7] -> [2:13] [40={pandas}]
3    v44 = new <Lscript s.py/massage_data>@21                                    s.py [2:0] -> [14:17] [44={massage_data}]
4    global script s.py/massage_data = v44                                       s.py [2:0] -> [14:17] [44={massage_data}]
5    putfield v1,< massage_data > = v44                                          s.py [2:0] -> [14:17] [44={massage_data}]
6    v47 = getfield < read_csv > v40                                             s.py [9:7] -> [9:22] [40={pandas}]
7    v46 = invokeFunction v47,v48;#iris.data                                     s.py [9:7] -> [9:35] [46={data, sample}]
8    BB2
9    v51 = invokeFunction v44,v46 s.py [10:7] -> [10:25] [51={data, sample}44={massage_data}46={data, sample}]
10   BB3
11   v56 = invokeFunction v5,v51 s.py [11:3] -> [11:10] [5={len}51={data, sample}]
12   BB4
13   v55 = binaryop(gt) v56 , v53:#10                                            s.py [11:3] -> [11:17] [53={cmp0}]
14   conditional branch(eq, to iindex=30) v55,v58:#0                             s.py [2:0] -> [14:17]
15   BB5
16   v60 = getfield < head > v51                                                 s.py [12:13] -> [12:22] [51={data, sample}]
17   fieldref v61:#n, v58:#0 = v53:#10                                           s.py [12:23] -> [12:24] [53={cmp0}]
18   v59 = invokeFunction v60 n:53                                               s.py [12:13] -> [12:30] [59={sample}53={cmp0}]
19   BB6
```

*FIG. 7*

| Method | Return | # |
|---|---|---|
| pandas.array | pandas.core.arrays.base.ExtensionArray | 2 |
| pandas.array | pandas.core.base.IndexOpsMixin | 2 |
| pandas.array | pandas.core.arrays.sparse.array.SparseArray | 1 |

*FIG.8*

| Module | Passed | Failed | Methods |
|---|---|---|---|
| Flask | 408 | 29 | 255 |
| Numpy | 4,881 | 5,139 | 262 |
| Scikit-learn | 17,900 | 1,142 | 371 |
| Sympy | 1,553 | 214 | 785 |
| Pandas | 48,625 | 6,453 | 624 |

*FIG.9*

Table 4: Statistics about dynamic types found

| | Number of dynamic types found | Mean number of types |
|---|---|---|
| PyType | 105 | 1.0 |
| Docstrings | 168 | 1.125 |
| Static Analysis | 132 | 1.96 |
| Docstring + analysis | 203 | 1.69 |

*FIG.10*

|  | Precision | Recall | F1-score |
|---|---|---|---|
| PyType | 0.067 | 0.067 | 0.067 |
| Docstrings | 0.661 | 0.529 | 0.587 |
| Static Analysis | 0.489 | 0.549 | 0.517 |

*FIG.11*

| Dynamic | Primitive | None | Any | BuiltIn | Class |
|---|---|---|---|---|---|
| Class | 0 | 0 | 270 | 0 | 0 |
| Builtin | 0 | 0 | 9 | 4 | 3 |
| Primitive | 3 | 0 | 17 | 0 | 0 |
| None | 0 | 4 | 1 | 0 | 0 |

*FIG.12*

| Dynamic | Primitive | BuiltIn | Class |
|---|---|---|---|
| Class | 0 | 0 | 124 (141) |
| Builtin | 0 | 0 | 13 |
| Primitive | 2 | 0 | 3 |

*FIG.13*

| Dynamic | Primitive | BuiltIn | Class |
|---|---|---|---|
| Class | 24 | 1 | 56 (134) |
| Builtin | 0 | 1 | 2 |
| Primitive | 23 | 0 | 0 |

*FIG.14*

| Pytype | Primitive | BuiltIn | Class |
|---|---|---|---|
| Any | 0 | 0 | 658 |
| Class | 0 | 0 | 162 (47) |
| Builtin | 0 | 0 | 100 |
| Primitive | 2 | 0 | 1 |

*FIG.15*

| Pytype | Primitive | BuiltIn | Class |
|---|---|---|---|
| Any | 617 | 183 | 1051 |
| Class | 36 | 17 | 77 (47) |
| Builtin | 133 | 124 | 66 |
| Primitive | 247 | 0 | 14 |

*FIG.16*

| | Total | Average types per method |
|---|---|---|
| Docstrings | 22,041 | 1.12 |
| Static Analysis | 15,486 | 1.50 |

TYPE INFERENCE IN DYNAMIC LANGUAGES

BACKGROUND

The present invention relates to the electrical, electronic and computer arts, and more specifically, to dynamic programming languages, machine learning, and the like.

Dynamic programming languages are a class of high-level programming languages that execute many common programming behaviors at runtime, which static programming languages perform during compilation. Such behaviors include, for example, an extension of the program by adding new code, by extending objects and definitions, or by modifying the type system.

Many dynamic programming languages do not enforce types of any kind. However, type inference is important to prevent bugs, to provide better program understanding, to provide better automation through code generation, and the like.

SUMMARY

Principles of the invention provide techniques for type inference in dynamic languages. In one aspect, an exemplary method for improving the technological process of programming a computer using a dynamic programming language includes generating a first portion of training data which maps types in the dynamic programming language to corresponding functions and methods in the dynamic programming language by performing information retrieval on documentation libraries in the dynamic programming language; training a neural network on the first portion of training data to infer unknown types in the dynamic programming language; carrying out inference with the trained neural network to infer the unknown types for program variables in a sample of code written in said dynamic programming language by inferring said unknown types based on presence of said corresponding functions and methods; and facilitating programming in the dynamic programming language based on the inferred unknown types.

In another aspect, another exemplary method for improving the technological process of programming a computer using a dynamic programming language includes generating training data which maps types in the dynamic programming language to corresponding functions and methods in the dynamic programming language by performing data flow analysis on a plurality of pre-existing programs written in the dynamic programming language; training a neural network on at least the training data to infer unknown types in the dynamic programming language; reducing a number of types to search during inference based on said program variable mapping; carrying out the inference with the trained neural network to infer the unknown types; and facilitating programming in the dynamic programming language based on the inferred unknown types.

In still another aspect, an exemplary computer includes a memory embodying computer executable instructions; and at least one processor, coupled to the memory, and operative by the computer executable instructions to perform a method for improving the technological process of programming the computer using a dynamic programming language. The method includes instantiating a neural network and a search engine; using at least the search engine, generating a first portion of training data which maps types in the dynamic programming language to corresponding functions and methods in the dynamic programming language by performing information retrieval on documentation libraries in the dynamic programming language; training the neural network on the first portion of training data to infer unknown types in the dynamic programming language; carrying out inference with the trained neural network to infer the unknown types for program variables in a sample of code written in said dynamic programming language by inferring said unknown types based on presence of said corresponding functions and methods; and facilitating programming in the dynamic programming language based on the inferred unknown types.

In a further aspect, another exemplary computer includes a memory embodying computer executable instructions; and at least one processor, coupled to the memory, and operative by the computer executable instructions to perform a method for improving the technological process of programming the computer using a dynamic programming language. The method includes instantiating a neural network and a static software analysis tool; using at least the static software analysis tool, generating training data which maps program variables in the dynamic programming language to corresponding functions and methods in the dynamic programming language by performing data flow analysis on a plurality of pre-existing programs written in the dynamic programming language; training the neural network on at least the training data to infer unknown types in the dynamic programming language; reducing a number of types to search during inference based on said program variable mapping; carrying out the inference with the trained neural network to infer the unknown types; and facilitating programming in the dynamic programming language based on the inferred unknown types.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments provide one or more of:

improving the technological process of programming in dynamic programming languages by providing reasonably high-quality labeled data for dynamic programming languages at a large scale, with better performance than static type checkers;

high quality labeled data, enabling better probabilistic type inference systems.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 presents exemplary code and documentation analyzed using an aspect of the invention;

FIG. 3 shows examples of classes that alias to a different class, which can be successfully analyzed using an aspect of the invention;

FIG. 5 presents a docstring extraction algorithm according to an aspect of the invention;

FIG. 7 shows an internal representation for the first script in FIG. 2, according to an aspect of the invention;

FIG. 8 shows an example of sharing small number of methods related to a duck typing aspect of the invention;

FIG. 9, FIG. 10, FIG. 11, FIG. 12, FIG. 13, FIG. 14, FIG. 15, and FIG. 16 show exemplary test results achieved using an exemplary embodiment of the invention;

DETAILED DESCRIPTION

Recently, dynamically typed languages, such as the PYTHON® language (registered trademark of PYTHON SOFTWARE FOUNDATION Beaverton, Oreg. USA), have gained unprecedented popularity. The PYTHON language is well-known to one skilled in the art. Although these languages alleviate the need for mandatory type annotations, types still play a pertinent role in program understanding and preventing runtime errors. An attractive option is to infer types automatically to obtain static guarantees without writing types. Existing inference techniques rely mostly on static typing tools, such as PyType, for direct type inference. More recently, neural type inference has been proposed. However, neural type inference is data hungry, and depends on collecting labeled data based on static typing. Such tools (i.e., static typing tools such as PyType), however, are poor at inferring user-defined types. Furthermore, type annotation by developers in these languages is quite sparse. One or more embodiments advantageously provide novel techniques for generating high quality types using: 1) information retrieval techniques that work on well-documented libraries to extract types, and/or 2) usage patterns, by analyzing a large repository of programs. Our experimental results show that these techniques are more precise as compared to the prior art, address the weaknesses of static tools, and/or can be useful for generating a large, labeled dataset for type inference by machine learning methods. F1 scores (harmonic mean of the precision and recall) are 0.52-0.58 for exemplary embodiments, compared to static typing tools which are at 0.06, and in our experiments, we used them to generate over 37,000 types for over 700 modules. Note that, as used herein, "well-documented" libraries are those where there are natural language descriptions of how to use various methods and classes inside. This documentation usually appears inside the code itself to define the objective of a function/class and the corresponding input/output formats.

One or more embodiments find practical applications in, for example, dynamically typed languages, type inference, static analysis, PYTHON, big code, mining software repositories, and the like.

Figure 1:
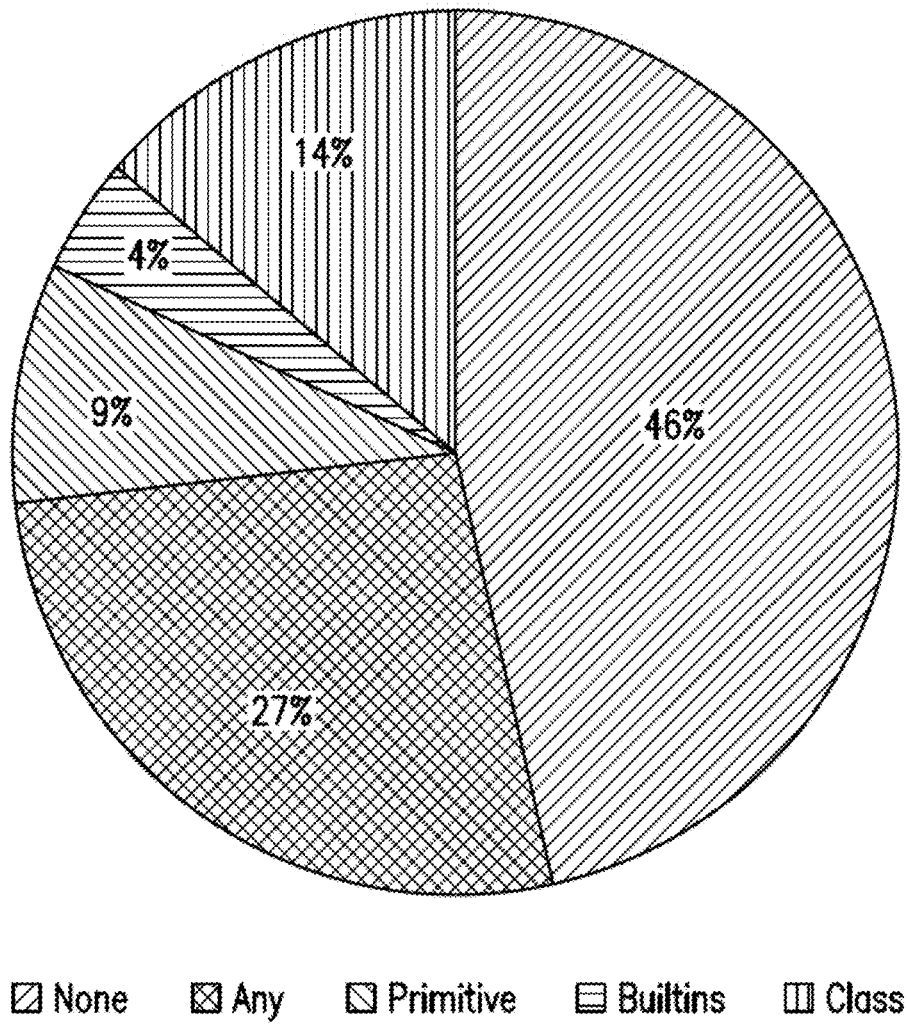
FIG. 1 illustrates type predictions according to the prior art.

As noted, dynamically typed languages, such as PYTHON, have become very popular. One reason is due to the unprecedented growth of Artificial Intelligence (AI) and the wide adoption of PYTHON for AI frameworks. PYTHON, like many dynamic programming languages, does not enforce types statically, but discovers errors only at runtime, which is popular because it allows programmers to build prototypes quickly. Types, however, are useful for program understanding, for finding errors early, and for improving program correctness. PYTHON introduced optional type declarations, but so far there has been little adoption. Furthermore, traditional type inference has so far proved largely ineffective. As shown in FIG. 1, which depicts PyType predictions for a dataset of 408 repositories, current techniques frequently produce "Any" as a type, which is equivalent to no information. Furthermore, only 14% of the types they produce are user-defined or library types, which tend to be much more prevalent in user code.

In this situation, machine learning has become a promising approach; recent systems perform type inference using neural networks. However, learning approaches require large amounts of type-annotated code for training, which does not currently exist. In fact, neural systems currently rely on tools such as PyType and Mypy software (available from The Mypy Project) or user specified annotations for their gold standard. This labeled data is skewed in ways that will affect the quality of the model that is built, and will provide potentially misleading estimates of accuracy when used as a gold standard.

One or more embodiments provide techniques to generate high quality types for methods, which can serve as labeled data for data-hungry machine learning approaches. While machine learning techniques have promise for the problem of general type inference, the current state of the art does not provide adequate mechanisms to address the problem of obtaining good quality labeled data. Advantageously, one or more embodiments (a) extract high quality types from well documented framework code to infer types, and/or (b) extract high quality types from their usage in code that is available for analysis. One or more embodiments advantageously produce better datasets for use in building improved probabilistic type inference systems.

One or more embodiments start with framework data because it is both well-used, and well-documented. To infer types from documentation, one or more embodiments use techniques from information retrieval to gather possible types specified in documentation and map them to a set of classes that are indexed using aspects of the invention. To infer types from usage, one or more embodiments mine usage from a large number (e.g., millions) of programs, and explore duck typing based on program analysis. Duck typing refers to the idea that if a class contains all the methods called on a given object, then it is a likely candidate for the type of that object. Although the idea of duck typing per se is not new, one or more embodiments apply it in a novel way. Specifically, one or more embodiments analyze a large (e.g., millions) repository of code files, and combine usage of the same libraries across these files. While one or more embodiments analyze individual programs, one or more embodiments observe how data flows FROM common API (application programming interface) calls TO objects returned by the calls across all programs. The duck typing method advantageously permits inference of user defined types; prior art duck typing techniques typically cannot infer primitives or builtin types since they do not correspond to known classes. In one or more embodiments, type inference from documentation advantageously allows doing better on builtins and primitives. We have found that by combining these techniques a greater variety of types can be inferred, and offset weaknesses in each technique.

One or more embodiments advantageously address one or more of the following:

using these two techniques to yield types that are precise enough to provide high quality labeled data;

using these two techniques to yield types that address some of the weaknesses of tools such as Pytype which currently are the state-of-the-art for obtaining labeled type inference data in PYTHON;

using these two techniques to yield types that provide non-overlapping sets of types, such that the union of the two approaches increases the size of the labeled set.

Our experiments show that in one or more exemplary embodiments, the two techniques produce types for over 37,000 methods and functions in 756 PYTHON modules. In our experiments, we compared the precision and recall of type inference techniques according to aspects of the invention against a set of types inferred from dynamic techniques, as well as manual annotations for a sample sizes of over 200 functions. Our F1 scores were 0.52 and 0.58 for static analysis and documentation inference, compared to PyType which was 0.06. Note that state-of-the-art neural prediction systems such as TypeWriter achieve 0.64 from a trained model based on type annotations. One or more embodiments are completely unsupervised and advantageously produce labeled data that will be helpful for building better neural models for type inference.

Example

FIG. 2 shows pertinent ideas behind large scale generation of labeled types for API calls, in the form of a code and documentation example for read_csv. Script 1 in the example, labeled 101, calls a function to read a pandas-.Dataframe object from the pandas library, and then passes the return value into a function, where the object is used as a receiver for the drop and drop_na calls. Script 2 in the example, labeled 103, has a more direct relation between the read_csv call and the to_csv call on the returned object. From the perspective of duck typing across multiple scripts, it can be seen that the type of returned objects from read_csv calls should support drop, drop_na, head and the to_csv. From the type definitions of classes of APIs, pandas.Dataframe is a candidate class. FIG. 2 shows the documentation associated with the read_csv function at 105, and it can be seen that the documentation is not formal enough to clearly denote the class being referred to, so additional processing is appropriate to infer the possible type. Classes are mentioned informally, with no reference to their fully qualified name. They are referred to with natural language using phrases such as DataFrame or Text Parser, so some mechanism should be provided to resolve the two classes mentioned here to their fully qualified names (e.g., pandas.core.frame.DataFrame). One or more embodiments use simple techniques from information retrieval to find potential types from documentation.

Dataset

In our experiments, we used a data set including more than one million publicly available PYTHON programs. To gather relevant classes and methods, the top 500 modules imported in these PYTHON programs were identified. For each of these modules, an attempt was made to programmatically create a virtual environment, install the module using pip, and then used the PYTHON inspect APIs to gather all the classes in the loaded modules, as well as their methods and relevant docstrings. PYTHON introspect APIs do not just provide classes from the loaded module; they gather classes from the modules that are in the dependency tree of the loaded module. Furthermore, a quirk of the PYTHON inspect API is that it specifies numerous classes that alias to the same class, based on the dependency of the module. The table of FIG. 3 (examples of classes that alias to a different class) shows such an example—the first two DataFrame classes from statsmodels actually map to a class in an entirely different module panda. Furthermore, because of PYTHON packaging, multiple PYTHON classes from within a module appear with different qualified names (as shown by the bokeh classes).

From the starting seed set of 500 modules, a result set of 1017 modules, 167,872 classes and 164,134 functions was obtained. To cleanse the dataset, each of 167,872 classes returned by the inspect API was loaded in a virtual environment, the class was loaded using the name returned by the API, and then its actual name was noted when a string representation of the class was printed. A map of classes to the class they were really aliased to was derived as shown in the table of FIG. 3, which resulted in 92,277 unique classes after aliasing. A similar approach was employed to alias function names; 164,134 function names were loaded, which resulted in aliasing to 91,818 functions.

Figure 4:
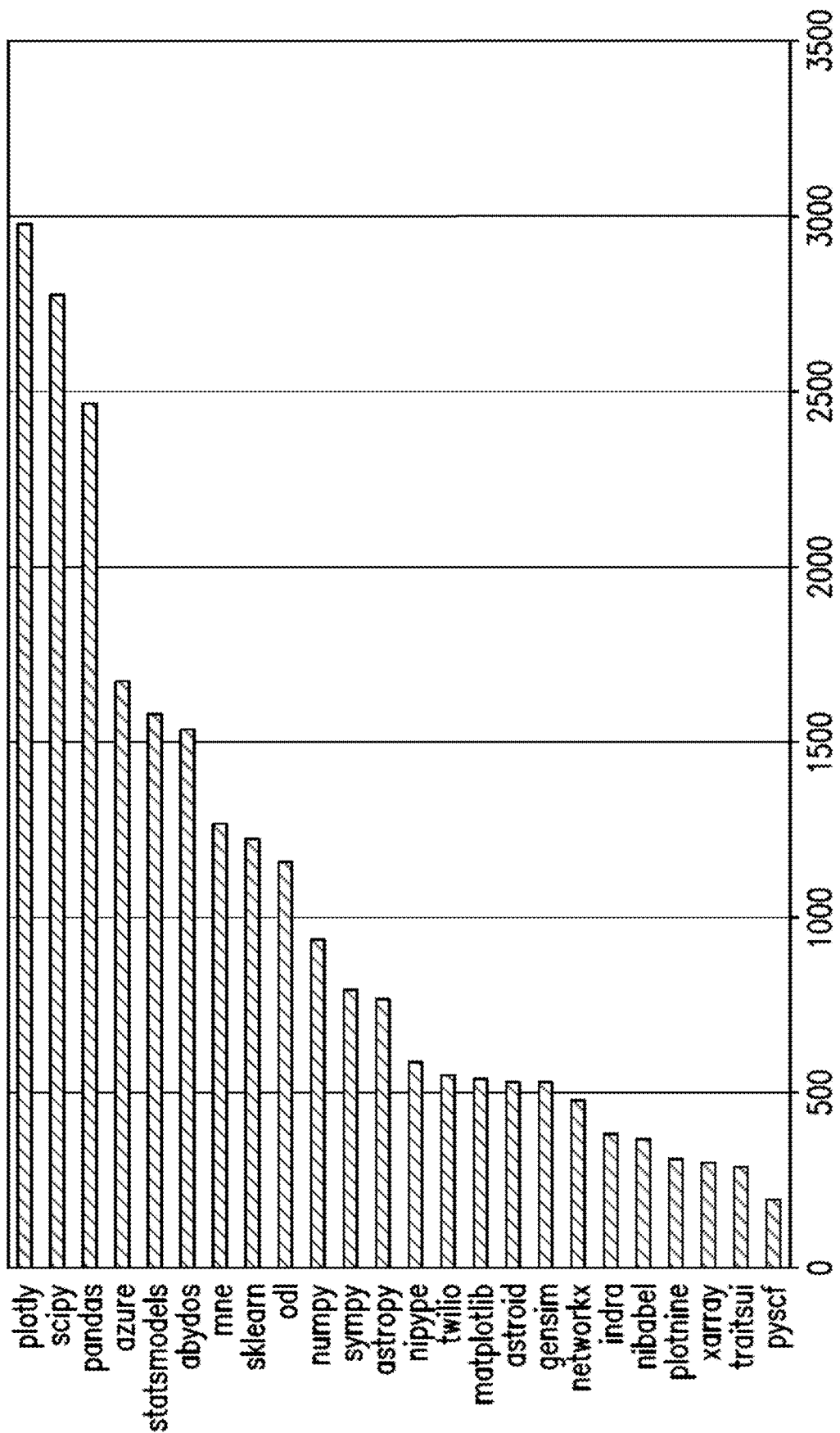
FIG. 4 describes the distribution of classes in the top 25 modules of a dataset used to test embodiments of the invention.

FIG. 4 (class distribution for top 25 modules) describes the distribution of classes in the top 25 modules. As can be seen, the modules cover a diverse set of functionalities, including libraries from visualization (e.g., plotly) to cloud management (e.g., kubernetes) to data science libraries (e.g., sklearn and pandas). In total, there were 26,800 class methods and 53,441 functions with docstrings.

Type Inference with Docstrings

Extraction of types: As shown in FIG. 2, documentation in API libraries is typically well-structured, and tends to be written using rich structured text to enable documentation generation from packages such as Sphinx. One pertinent question is how to leverage information retrieval techniques to infer type information from such documentation. In our experiments, we focused on returns, to illustrate an exemplary method, as described in Algorithm 1 in FIG. 5 (docstring extraction algorithm). Given a set of modules l, gather all the functions and methods declared in the module into l f. For each f, collect its class (if it is a method) into a set C, and obtain the corresponding docstring r. In our experiments, we used the sphinx library in PYTHON to parse the docstring into restructured text. In our example, this strips the 'Returns' portion off the entire method docstring, so the text shown in FIG. 2 is obtained. This structured text r contains each class and function's return value in an informal manner; for instance, in FIG. 2, it is stated that the return value is either a DataFrame or a TextParser. To infer the qualified type, a 'document' d was created for each function or method, setting the fields of function and content, and d was indexed in a search and analytics engine text index. At the end of inspection of all modules, every method's return type has been added to the index. Then, loop through all classes in C and search the search and analytics engine index for all d documents that have this class mentioned in them in their return text. Each d has an inferred type set where the fully qualified classname c is added to the function's return type. Every d in the index at the end of the extraction process is then a function for which a type has been inferred based on docstrings, if d has an inferred type field set.

Cleansing: Because type inference with this mechanism can be quite noisy, in our experiments, we employed a postprocessing step to filter out erroneous annotations. In particular, for a method and its list of inferred types returned from the above step, the following were performed:

Using the map of classes to the class they were really aliased to (see the table of FIG. 3), each return user-defined type was mapped to its correct alias. For example, the class pandas.DataFrame is mapped to pandas.core.frame.DataFrame. Note that both forms are valid in PYTHON, and in fact, user code will frequently contain imports of pandas.DataFrame, but at runtime the interpreter will return pandas.core.frame.DataFrame.

Remove any type that cannot be resolved to any valid type, based on classes that the inspect API provides, but which fail when an attempt is made to load them at runtime because they do not exist.

Remove user defined types from different libraries, when there are classes as return types which are candidates for the type within the same library. This last approach is based on the heuristic that if a class with the same name is present in the same library it is more likely to be a candidate for return than a class with the same name from another library. Note that existing systems for type inference, such as TypeWriter, ignore the fully qualified name of the class, which is problematic because we observed this as an issue in our experiments.

Remove all other classes if a builtin or a primitive is a match. This step is appropriate to avoid matches to classes which have the same name as a builtin or a primitive (e.g., Dict) but clearly are unlikely matches.

Type Inference with Analysis

One method to infer types is to perform dataflow over millions of scripts, and observe what methods are called on objects returned by a specific method call. One or more embodiments provide a novel set of changes introduced into static analysis infrastructure to support this type of analysis and/or techniques to perform duck typing in an improved manner.

Extended Analysis Approach: To perform this dataflow, in our experiments, the scope of analysis was confined to the level of each PYTHON file in our sample set. Each method in the script was used as a starting point, as well as the script itself, to ensure maximal coverage of the code in the script. The exemplary analysis was inter-procedural, so that as shown at 101 in FIG. 2, the dataflow was followed into the procedure massage_data to find that the return value of pandas.read_csv has both dropna and drop called on it, followed by a call to head guarded by a conditional.

The skilled artisan will appreciate that PYTHON scripts are typically not self-contained, but rather include imports of libraries and API calls, or user modules with code contained in other files. To perform analysis on a large number of files under such circumstances, we have found that it is important not to assume that it will be possible to create a large number of stubs for such calls, or that the library code will be amenable to analysis. One or more embodiments provide a mechanism referred to as 'turtles' to handle such imports or calls on functions that were not part of the script. In this exemplary aspect, all returns from API calls are represented as instances of a single "turtle" type (a minimal model of an object returned by a library) and all calls on such objects return new instances of that type. Similarly, access to properties of those objects returns the object itself. This can be expressed in common analysis frameworks and formalisms, with customization of three aspects of analysis. Consider these three in terms of the analysis abstractions that should be customized for any analysis framework.

Overall, there are three key changes appropriate for an analysis framework to allow a turtle-based analysis of the program:

The imports of the required APIs should be replaced by turtle creations. The way import calls are represented will vary amongst analysis frameworks; in an exemplary implementation, the import call is modeled as a call to a synthetic function that returns a newly-allocated object of "turtle" type. This function is analyzed using call-site sensitivity, i.e., a separate analysis for each call, so that each API import creates a different turtle object. In FIG. 2, read_csv is imported, so the return of the call on it is represented by a turtle.

The semantics of property reads should be changed so that any property read of a turtle returns the container object itself. This can be modeled by performing field-insensitive analysis for objects of turtle type, i.e., by modeling all properties of those objects with a single property. When turtle objects are created, the turtle object is assigned to its single property.

The semantics of function calls should be augmented such that any call on an object of turtle type is a call to a synthetic function that returns a new turtle object. For function calls, every function can simply be modeled with the same synthetic function that returns a new turtle. In PYTHON, a call such as pd.read_csv includes first a property read and then a call. Since property reads on turtles already return the same object, the synthetic model of function calls suffices for method calls too.

Figure 6:
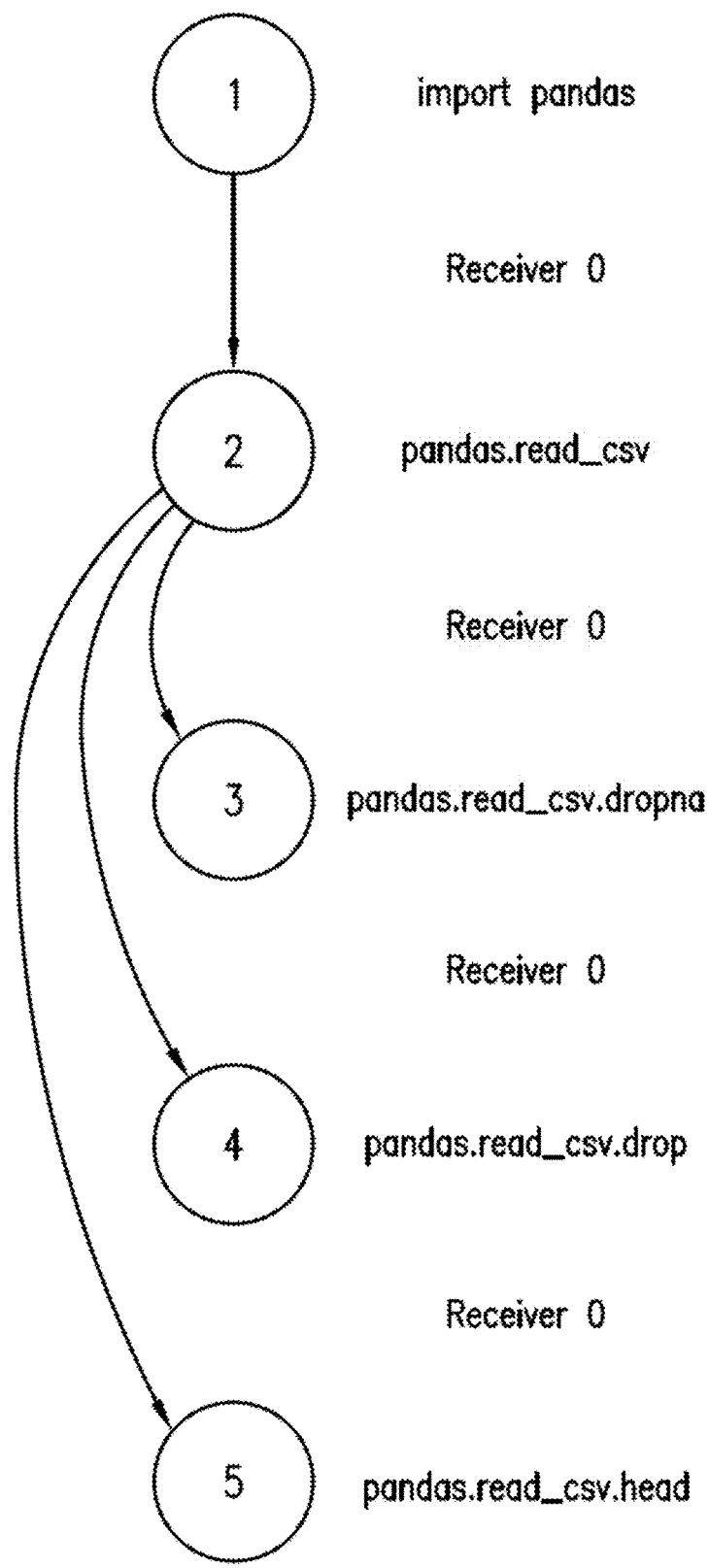
FIG. 6 shows a data flow for the first script in FIG. 2, according to an aspect of the invention.

An extended analysis framework performs a standard combined call graph construction and pointer analysis that computes, for each call site, what functions may be called, and for each value, what objects it may hold. Analysis starts at a root function, analyzing each instruction, adding functions found at call sites to a work queue. To make the workings of the analysis more concrete, use the IR (internal representation) for the script 101 of FIG. 2. The code is organized as a sequence of basic blocks (denoted BB0, BB1, etc. in FIG. 7) of operations such as property reads, and all values are in Static Single Assignment form. An illustration of how the analysis works for turtles is provided by stepping through what the analysis does when the script is analyzed. FIG. 6 shows a data flow for script 1 101 in FIG. 2. In FIG. 6, the circles 1, 2, 3, 4, 5 represent turtles, and the arrows represent data flow between them. At circle 1, "pandas" is unknown; logic flows to the next circle. The result of pandas.read_csv is shown for dropna, drop, and head. Receiver 0 means that each circle potentially has multiple arguments, like a function call. Dropna is called on 2 (pandas.read_csv) so that becomes the receiver. FIG. 7 shows the internal representation for script 1 101 in FIG. 2, on which the analysis is computed. The "invokeFunction" represents turtle calls; "getfield" represents a read; "putfield" is a write; "invokestatic" in line 2 is a special kind of function call used to represent import. "BB" means basic block and "gt" determines if one value is greater than another. Given the teachings herein, the skilled artisan will understand the IR in FIG. 7 based on her or his understanding of compilers.

Instruction 2 is the import corresponding to line 1 of FIG. 2 location 101. This instruction assigns the imported script to v40, which is represented with turtle $t_1$.

Instructions 3-5 create the inner function massage_data from lines 3 to 8. Functions are represented as objects in the analysis, since they can be first class.

Instruction 6 reads the property read_csv from v40, which holds the imported pandas script, and assigns it to v47. This is also $t_1$.

Instruction 7 calls v47 as a function. Since v47 holds $t_1$, and the semantics of function calls on turtles is to create a new turtle, assign the new turtle $t_2$ to v46.

The rest of the instructions are mostly analogous, except one.

Instruction 9 calls v44, which is massage_data. This is not a turtle, so the code for that function is added to the work queue of the analysis. v46 is passed as an argument, corresponding to passing the result of the read_csv.

There is one aspect of analysis not illustrated by this code snippet: at line 12 of FIG. 2 location 101, the built in len call will be passed a turtle returned by read_csv and ultimately massage_data. Since the analysis makes no assumption about the meaning of a turtle, calls to primitives are treated as simply returning any of the turtles that are used as arguments.

Duck Typing: As described above, analysis in one or more embodiments is neither sound nor complete. Traditional approaches to duck typing require that for every object O that is returned from a method call M, the set of method calls on O, referred to as F, are observed. F should be defined in a given class C in order to infer that C is a return type M. Because there may be imprecision in analysis, it is possible that there are methods in F that are incorrect. For instance, in FIG. 2, the call to head is under an if, so it might not be called. This code would work even if small tables returned a type that did not support head. To handle this situation, approximate duck typing by instead computing the size of F∪D where D is the set of all methods defined for C. The likelihood that type inference was correct is governed by two factors: (a) the size of F∪D, and (b) the number of classes that are possible types for a given method return value. As (a) increases, confidence in type inference grows. However, a small number of classes in (b), in combination with a small number of shared methods in (a), can sometimes still imply a valid inference. An example of such a case is shown in the table of FIG. 8 (example of sharing a small number of methods), where, for instance, it is found that pandas.array returns pandas.core.arrays.base.ExtensionArray correctly, and in fact pandas.core.arrays.sparse.array.SparseArray is a subclass of pandas.core.arrays.base.ExtensionArray.

Analysis Cleansing: We have found that a large number of spurious types often result from initial duck typing of code, and in one or more embodiments, we filter them in a series of steps:

Since duck typing in one or more embodiments is not entirely precise, a first step in one or more instances is to filter candidate types to those that match the largest number of methods called in the code.

There are often many concrete types that share a common supertype that is also present in the set of types. In this case, remove the subtypes, since they are covered by the supertype.

Sometimes most of the types in a set share a supertype S that is not itself in the set. In this case, remove types that are not subtypes of S, since they are often due to analysis imprecision.

Use lists of functions and classes to remove items that are in fact modules, but appear ambiguous due to the fact that imports can be of anything.

Eliminate classes and functions that were not valid as before, and use their aliases.

Experimental Evaluation

Precision of Labeled Types—evaluation against dynamic types: To develop a gold standard for evaluation, in our experiments, we collected a set of types by observing their runtime types. The experiments targeted 5 repositories from a set of 408 repositories that (a) used pytest for unit testing, and (b) seemed to be set up relatively easily without a set of additional dependencies on databases, servers etc. For each function invoked by pytest in the tests, a wrapper function was inserted, which would log its return type before return. So-called "monkey patching" (i.e., extending or modifying supporting system software locally (affecting only the running instance of the program)) was leveraged in pytest and pytest fixtures to insert the wrapper. The skilled artisan will be familiar with monkey patching from, for example, "Monkeypatching/mocking modules and environments" available from PyTest dot org ("dot" replaces "." to avoid inclusion of browser-executable code), Holger Krekel and pytest-dev team, 2015-2020. The table of FIG. 9 shows the number of tests that passed or failed in each package (summary of number of passed and failed tests and number of methods inferred for each module). The types gathered by monkey-patching are always sound, but not necessarily complete. 2284 distinct methods for which types were available were gathered.

Each method was annotated, often with multiple types. Some of the cases were manually inspected and the set of dynamic types was augmented, when possible, based on documentation, and running the code. Appropriate care should be taken when instrumenting the libraries.

The table of FIG. 10 (statistics about dynamic types found) shows the total number of tests that were run to obtain the 2,284 methods gathered from dynamic typing. The number of matches were quite low for each type inference technique, but investigation showed that this was because method names for functions that dropped the class name (obtained, e.g., using dill) were frequently received, from the run-time. Of the three methods, extraction from docstrings retrieved the types for most functions. Analysis was next, followed by PyType. Doc-strings when combined with analysis yielded return types for 203 methods, which is 9% of the methods for which dynamic information was available.

The table of FIG. 11 (precision of docstrings and analysis based type inference versus PyType) shows the results of precision and recall for PyType, and separately for type inference based on docstrings and type inference based on static analysis and duck typing. PyType's F1 score was very surprisingly low (0.067), but this result is consistent with the % accuracy reported in the prior art when the type is a user defined type. In contrast, the F1 score for type inference based on docstrings was 0.587, and 0.517 with static analysis; a significant improvement over PyType.

Precision of Labeled Types—evaluation of class constructors: Dynamic typing is one method to analyze the precision of type inference. One or more embodiments exploit a feature of the PYTHON language as a type of sanity test for the precision of static analysis-based type inference. In PYTHON, as in many dynamic languages, a constructor is simply another method. This fact was used to generate a gold standard of methods for which the return type was known. All 92,277 classes were gathered from inspect, and inquired whether their constructors were inferred correctly by an exemplary embodiment for type inference using static analysis. Recall for constructors was 0.0459, indicating that only a small percentage of classes were used in practice. Of those, static analysis-based duck typing produced the correct type for 4,236 types, and an incorrect value for 130 types, for a precision that was 0.97. The errors were due to errors in gathering class definitions. As an example, QtNetwork.QLocalSocket is a class that we see in usage, and it has a method waitForConnected called on it in code. However, in the inspect output, no method waitForConnected was found, and hence it was not associated with any class. Note that in general, the inspect API from PYTHON had several inaccuracies which added noise to the process. Nevertheless, the test with class constructors suggests the analysis and duck typing approach does work.

Precision of Labeled Types—manual annotation: To evaluate the type inference for the two techniques further, a random sample of methods was selected for each technique, and an attempt was made to manually evaluate if the return type was correct. Note, in this case, it is not possible to actually evaluate recall or F1, but this sort of qualitative assessment is useful to understand where the weaknesses of each method are. For analysis, in our experiments, we tried to find as much information as we could from documentation on the web or what we had gleaned from inspection to make the decision on whether the returned type was correct or not.

Static Analysis Sample: For 25/108 methods, sufficient documentation could not be found to infer the return type correctly. For the remaining methods, multiple types were often returned. Across all those returned types, the exemplary embodiment was correct on 71/163 (43.56%) cases (where each case reflects a specific type inference), which is lower than what was observed with dynamic typing, which may just reflect sampling noise. One observation from this exercise is that classes are often found that are conceptually very similar, but they are not related from a type perspective. As an example, scipy.spatial.kdtree.KDTree was found as a return type for sklearn.neighbors.BallTree. Both are conceptually related, both are derived from BinaryTree, but of course one cannot be substituted for another. This is a weakness of the duck typing approach in general.

Docstrings Sample: Another random sample of 200 methods was created from docstrings type annotations. In our experiments, we could not manually verify the return type of 67 methods which were mostly internal setter functions inside libraries like plotly. For the rest of the methods, the return type was predicted correctly for 103/133 (77%). One common issue with docstring-based types is its imprecise-ness when the documentation is not sufficient or vague. In numpy, for instance, documentation frequently states that the return value is an array, but what was being returned was numpy.ndarray. In such cases, relying on usage patterns could infer better types.

Weaknesses of static typing in PyType: The next question evaluated was whether one or more exemplary embodiments for type inference addressed some of the weaknesses referred to in the introduction with static typing tools such as PyType. We chose to compare against PyType because of the observation that PyType is slightly better than MYPY in type inference.

Figure 17:
FIG. 17 is a bar graph comparing percentage of predicted types for two prior art techniques and an exemplary embodiment of the invention.

FIG. 17 (percentage of predicted types using dynamic typing, PyType, and an exemplary embodiment) shows the distribution of types for dynamic typing, versus PyType and an exemplary embodiment. Once again, as discussed with respect to FIG. 1, PyType tends to produce fewer user defined types, and produces a large percentage of types that are labeled Any which is not very precise type information. One or more embodiments are biased against void types, unless those are inferred from documentation. For the purposes of harvesting high quality labeled data, it is less important to model 'void' correctly. For all other categories, an exemplary embodiment appears to infer as many types as produced by dynamic types.

To examine the nature of each typing method, and its errors against the dynamic types, a confusion matrix was computed for each method. The table of FIG. 12 (confusion matrix for PyType against dynamic types) shows the same behavior as observed in FIG. 1 for PyType. Note that the tendency to respond with Any in this system is true across all types, but exacerbated for user defined types, to the point where none of the user defined classes were ever inferred correctly. In fact, PyType frequently returned the name of a module (e.g., sympy for user defined classes such as sympy.core.power.Pow). The inference techniques employed had the exact opposite bias. The table of FIG. 13 (confusion matrix for static analysis—number for class reflects errors (correct answer is in parentheses)) shows that analysis tends to err on the side of providing user defined types. The confusion for builtins reflects coarseness in how flow was modeled—if some object was retrieved from a tuple or a list and then a method was called on the object, a direct data flow was falsely assumed. The table of FIG. 14 (confusion matrix for Docstrings—the number for class reflects errors (correct answer is in parentheses)) shows the confusion matrix for docstrings, which also shows a similar error pattern as analysis, frequently confusing primitives and builtins with user defined types. Most of those errors in the docstring case came from the fact that the docstring for numpy methods frequently returns a user defined class numpy.bool_ but states that it returns a bool type. Similarly, for builtin, when tuples were returned but the documentation stated the types being returned in the tuple, an exemplary embodiment incorrectly stated that the return type was one of the mentioned types.

In our experiments, we also examined to what extent an exemplary embodiment and PyType agree on the types returned from static analysis, as shown in the table of FIG. 15. The agreement is small (22%) even when PyType returns a type that looks like a class, as shown in the table of FIG. 15 (Confusion matrix for PyType vs. Static Analysis—the number for class reflects differences (agreement in parentheses)). This agreement is much worse than agreement between type inference with docstrings and type inference with analysis (61%). In many cases, PyType does not return a fully qualified name of the class, so, in our experiments, our measure of the overlap of 47 cases was adjusted to consider cases when the class name matched. In 36 cases, PyType returned a module as a returned type, which means in 36/209 cases (17%) PyType is returning imprecise information about types when it infers a class.

A similar comparison with type inference based on docstrings is shown in the table of FIG. 16 (Confusion matrix for PyType vs Docstrings—the number for Class reflects differences (agreement in parentheses)). When PyType produced a class, it matched a docstring-based class in 47 cases, with an agreement of about 38%. Docstring-based inference seemed especially prone to disagreeing with PyType on builtins, most likely because documentation often refers to both the data structure and the types held in it (e.g., list of int). Once again, PyType returned a module instead of a class 34 times, which is 34/124 (27%).

Figures 18, 19:
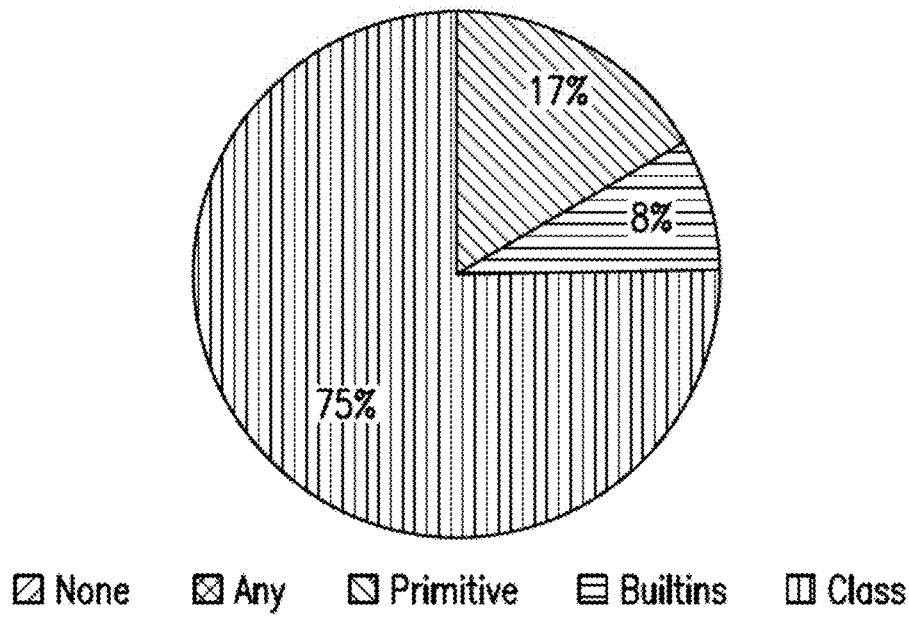
FIG. 18 is a view similar to FIG. 1 but showing type predictions obtained using an exemplary embodiment of the invention.
FIG. 19 shows a summary of types inferred by docstrings and statis analysis techniques used in aspects of the invention.

Properties of the inferred types dataset: The table of FIG. 19 (Summary of types inferred by the two methods) shows some summary statistics of the two methods of type inference. As shown in the table, together the two techniques yield over 37,000 labeled types. The degree of intersection between the two was small (410) because the focus of each is quite different. When they did produce types for the same methods, they agreed in 249/410 cases (61%). FIG. 18 (Static Analysis and Docstrings-based predictions per type category) shows the distribution of predictions per category type. Comparing to PyType (see FIG. 1), it can be seen that one or more embodiments complement PyType by producing more user defined types instead of None and Any types as from PyType. This, and the accuracy results shown earlier, demonstrate that one or more embodiments can indeed produce better quality type annotations (turning inconclusive types like Any and None to real types) that can further improve existing type inference techniques.

Figure 20:
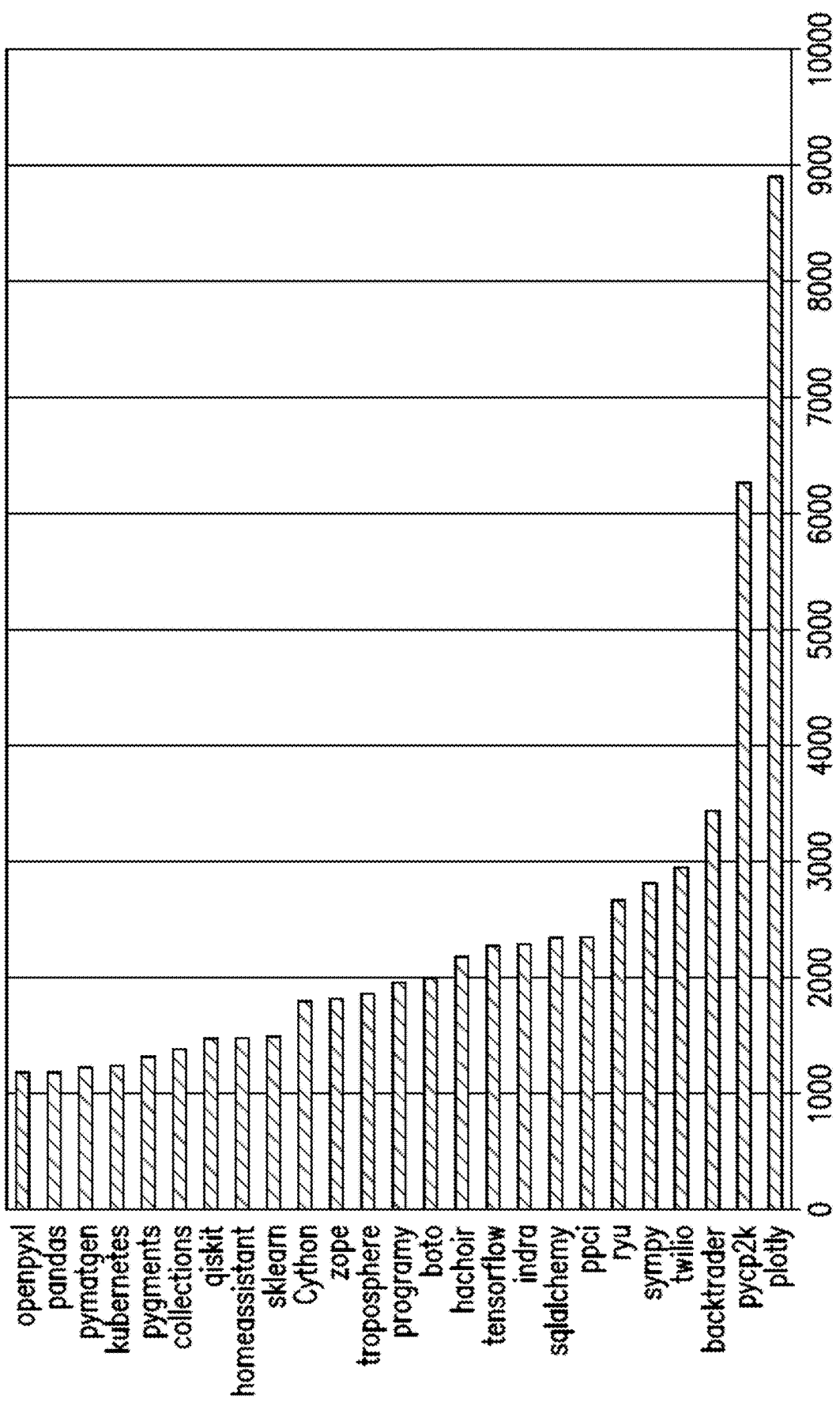
FIG. 20 shows the distribution of the top modules for which the two methods of FIG. 19 inferred types, according to an aspect of the invention.

FIG. 20 shows the distribution of inference for the top 25 modules for which the two methods inferred types. Some of these modules had the most classes as shown in FIG. 5, but not all. This is in keeping with the fact that type inference with docstrings and type inference with analysis have different strengths, so modules with a larger number of classes do not completely govern the effectiveness of type inference.

It will thus be appreciated that documentation can be leveraged, as well as usage information, to produce reasonably high-quality labeled data for PYTHON and similar dynamic languages, at a large scale. One or more exemplary embodiments achieve significantly better performance than static type checkers, and also produce high quality labeled data, enabling better probabilistic type inference systems.

Many dynamic programming languages, such as PYTHON, do not enforce types of any kind, i.e., types are not mandated in these languages. Type inference is important to prevent bugs, for better program understanding, for better automation through code generation, to determine the location of errors, and the like. There is context embedded in individual programs that can help type a return object; this is so-called "duck typing." The idea is that if a class contains ALL the methods called on a given object, it is a likely candidate for a type. This works well if a given program calls a number of methods on an object, but not so well if it does not. One or more embodiments employ duck typing across large repositories of code (a) to infer types on a given program with a significant number of method calls, and extrapolate to others, and/or (b) infer types across a set of programs with the same API calls, using multiple method invocations across programs to infer types. In one or more embodiments, collect all the methods in a class, and observe the return types of the functions. Refer again to the above discussion of extraction of types. In a non-limiting example, consider a random piece of PYTHON code and an object; a lat method and a long method are called on the object. Determine what types have lat and long methods as part of location. It can be assumed that an unknown item has got to be one of the types to lat and long. If there are six methods that are called on the object, the object should support those six methods. That information can be used to filter what kind of object is present.

Figure 21:
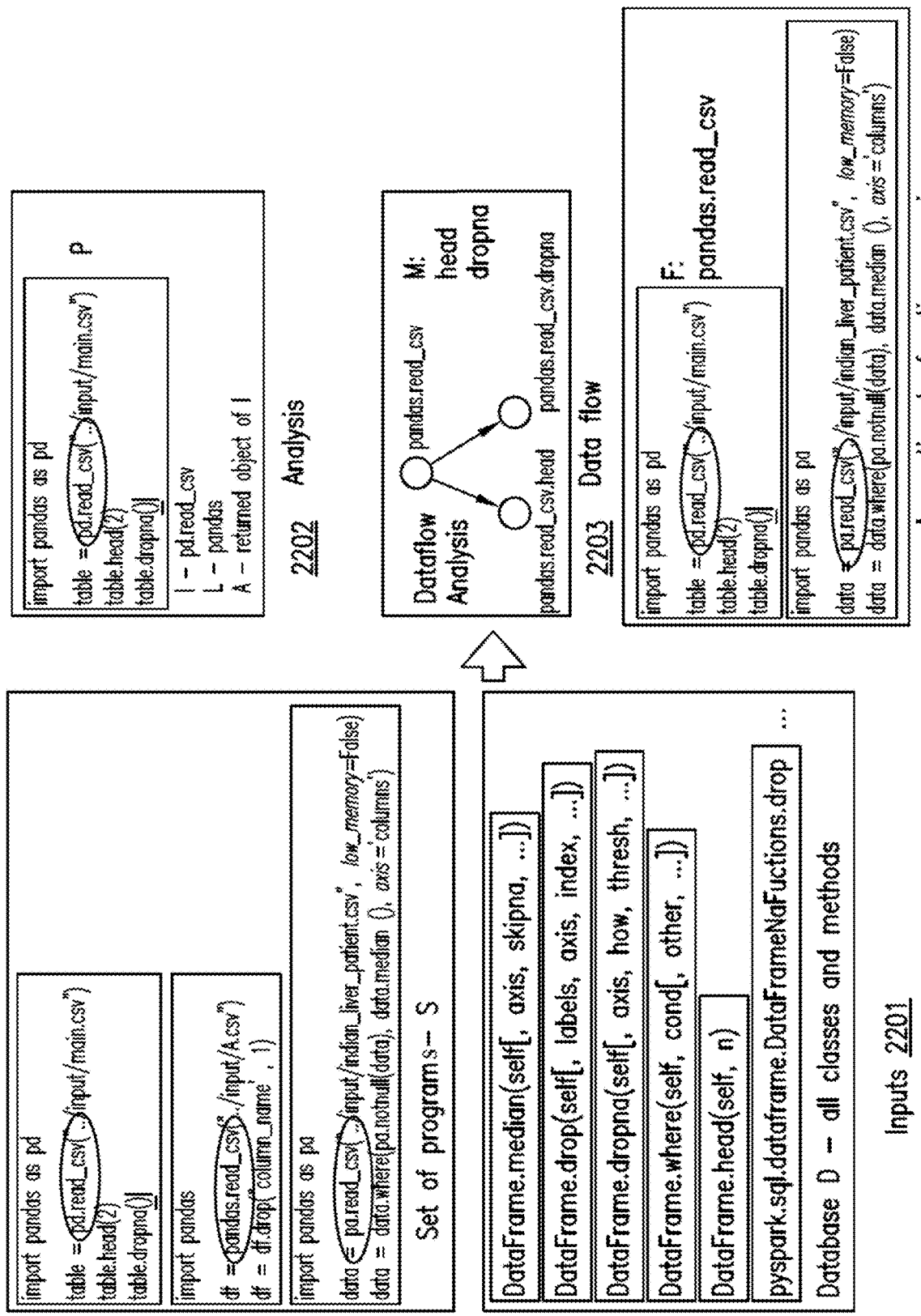
FIG. 21 and FIG. 22 show exemplary type inference steps, according to an aspect of the invention.
Figure 22:
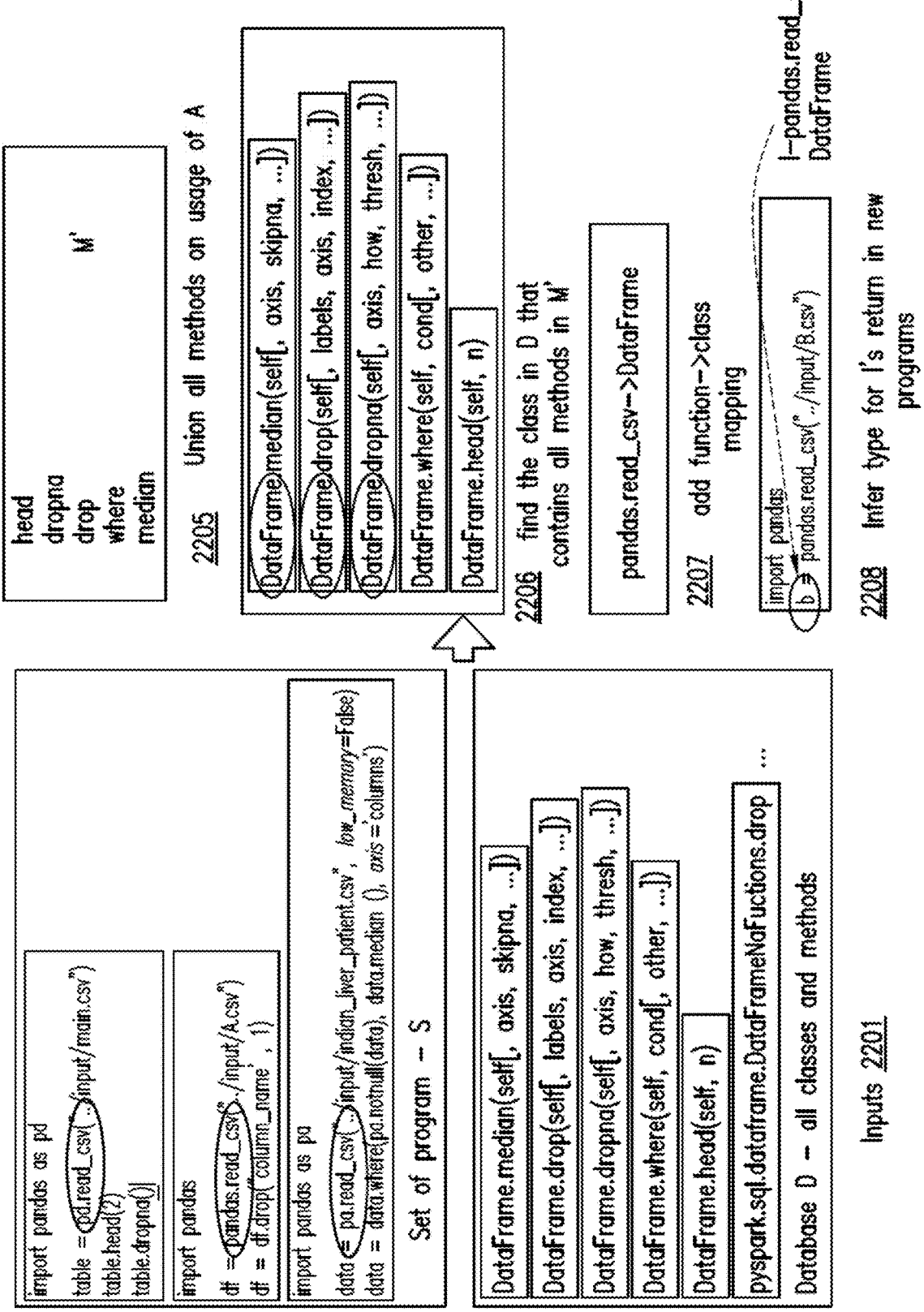

Referring to FIGS. 21 and 22, one or more embodiments provide techniques to infer types in dynamic programming languages. For example, as seen at the inputs 2201, given a set of programs S, and a database D of all classes, and the methods of each class, at 2202, apply static analysis to each program P in the set of programs S where any invocation (I) (here, a pd.read_csv object) to any imported library L in a given program P is assumed to return a new object A of an unknown type. In the example, head and dropna are called on the new object A of unknown type. At 2203, use data flow analysis on P to identify all subsequent method calls on the new object A, and determine the union of all methods M that are called on object A. Those should be the methods that any class that fits that object has to have. At 2204, for each invocation I in imported library L, let F be the function L.I based on analysis. At 2205, across the set of programs S, create a union of methods M' which unions all Ms across all Ps on the exact same function F. At 2206, consult the database of classes and methods D to find the classes C that contain all the methods in M' for a given function F. At 2207, add mapping of the function signature of F (return type of functions) to C. At 2208, apply the map of F→C on a new program containing an invocation I which has the corresponding function F, to infer the type returned by I. Thus, a machine learning process had been carried out and in step 2208 it can be used for inference on new programs. Some embodiments implement type inference based on static analysis. In some instances, type inference can also be carried out based on communication strings. For example, take documentation pertaining to a particular API and infer the return types and the parameter types based on mentioned class(es). There is a database of classes and methods. Classes that are valid classes can be searched for in the database.

It is worth noting that, unlike certain prior art approaches that focus on a single program (e.g., variable assignments), one or more embodiments advantageously examine uses of an expression in method calls and/or analyze a large repository of programs to build a database of invocations to class mappings. For example, one or more embodiments perform static analysis on large corpora of code to build a database of method invocations to classes, rather than analyzing content of a single program using, e.g., declarative import statements. In one or more embodiments, no reflection mechanism is required, and/or server source code is not needed (for example, because in one or more embodiments, turtles are a facade standing in for the server code). Advantageously, one or more embodiments do not require running the code and going through the complexity of dynamic analysis; rather, one or more embodiments perform static analysis on a large number (e.g., millions) of code files to gather a large database of invocations based on data flow analysis. This database is then used to infer return types based on the methods called on the object being inferred. Indeed, instead of a single source file, one or more embodiments perform static analysis on millions of dynamic code files (e.g., for dynamically typed languages such as PYTHON) and hence build a concrete map between invocations and classes based on data analysis. Carrying out efficient static analysis of a large number (e.g., millions) of programs allows one or more embodiments to have an enhanced ability to collect more calls across programs on any certain object type. Thus, one or more embodiments employ duck typing across large repositories of code (a) to infer types on a given program with a large number of method calls, and extrapolate to others, and/or (b) infer types across a set of programs with the same API calls, using multiple method invocations across programs to infer types. One or more embodiments provide type-inference for dynamically typed languages such as PYTHON.

One or more embodiments thus provide techniques for using a computing device to infer types in a dynamic programming language, including receiving, by a computing device, a set of programs and a database of all classes, each class including one or more methods; applying, by the computing device, a static analysis to each program of the set of programs, where any first instance of an invocation to any imported library in each program is assumed to return a new object of unknown type; using, by the computing device, a data flow analysis to identify one or more subsequent method calls on the new object of unknown type and mapping the result; applying, by the computing device, the mapping to analyze a new program which has the invocation to the imported library; and inferring, by the computing device, the type returned by the invocation based upon the mapping.

Given the discussion thus far, it will be appreciated that, in general terms, according to an aspect of the invention, an exemplary method is provided for improving the technological process of programming a computer using a dynamic programming language. The method includes generating a first portion of training data which maps types in the dynamic programming language to corresponding functions and methods in the dynamic programming language by performing information retrieval on documentation libraries in the dynamic programming language. This step can be carried out, for example, using techniques discussed above with regard to type inference with docstrings, as well as Algorithm 1 in FIG. 5. A suitable commercially available search and analytics engine can be employed in some instances, as well as high-level code implementing type inference/Algorithm 1 that is compiled or interpreted into computer-executable code.

A further step includes training a neural network on the first portion of training data to infer unknown types in the dynamic programming language. The skilled artisan will be familiar with training computerized neural networks per se, and, given the teachings herein, will be able to train a computerized neural network on the generated data. A still further step includes carrying out inference with the trained neural network to infer the unknown types for program variables in a sample of code written in said dynamic programming language by inferring said unknown types based on presence of said corresponding functions and methods. The skilled artisan will be familiar with inferencing using computerized neural networks per se, and, given the teachings herein, will be able to carry out inferencing with a computerized neural network trained on the generated data. Refer, for example, to FIG. 2, lines 10-13. The training data indicates that a given type has certain functions and methods. Inference is carried out based on that, essentially determining what types a variable might have.

Yet a further step includes facilitating programming in the dynamic programming language based on the inferred unknown types. A wide variety of programming activities can be based on the inferred unknown types. For example, most dynamic languages, including JavaScript and PYTHON, include optional syntax to express type information. Embodiments of the invention can generate the type information for an existing program. This is effectively the generation of a new program that is different than the original program because of the additional annotation. That is to say, in this aspect, the programming includes creating a new program based on the existing one, where the new program includes declarations of the inferred types. Another exemplary programming activity is based on abstraction across different programs to understand common things programmers are doing with a given dataset. This activity is helpful, for example, in the artificial intelligence and machine learning fields. For example, suppose a CSV file is read and a few columns are dropped from the file. Suppose something else is also done with that CSV file, without dropping the columns—another program may read the CSV file and directly carry out the same operation without dropping any columns. Currently, programmers could not understand that both programs are doing the same thing because they would not understand the types on which the second methods are being called; current techniques would wrongly infer that the two programs are doing different things. One or more embodiments can be used to obtain a level of abstraction on what the code is doing. Another exemplary programming activity is the use of typing in accordance with embodiments of the invention to optimize code in a runtime system or compiler. Actual programming can be carried out by a human programmer using a program editor, for example; the activity can be facilitated by making the inferred types available to the programmer in a suitable file or other data structure.

In some instances, further steps include generating a second portion of training data which maps the program variables in the dynamic programming language to the corresponding functions and methods in the dynamic programming language by performing data flow analysis on a plurality of pre-existing programs written in the dynamic programming language; and performing a union operation on the first and second portions of training data to obtain combined training data. This step can be carried out, for example, using techniques discussed above with regard to type inference with analysis and a suitable static analysis software tool. In this aspect, the training of the neural network includes training on the combined training data to infer the unknown types in the dynamic programming language. The T. J. Watson Libraries for Analysis (WALA) provide static analysis capabilities for Java bytecode and related languages and for JavaScript, are available from International Business Machines Corporation, and can be used in some instances.

Further regarding generating a second portion of training data which maps said program variables via data flow analysis, this training data can be generated from the plurality of pre-existing programs, and permits reducing the number of feasible types during inference. For example, go through the program, and for each variable (e.g., data starting at line 10 in FIG. 2) see what functions and methods are called on it and from that infer what types it might hold—it can only hold types for which those methods and functions are actually implemented. That is to say, data has to be something that has a head method. Consider data.head in line 13—any type that the variable data might have (any object that might be assigned to data) must have the head method because same was just called. This allows restricting what types data might actually have. Since only some types actually have a head method, this helps to determine what type data might actually be.

A further step includes reducing a number of said types to search during said inference based on said program variable mapping. In essence, the search space is constrained and classification is carried out on a smaller set of types. If a method is called on a variable, the variable can only have types that actually implement that method.

Thus, all embodiments do not necessarily have to use both the information retrieval on well-documented libraries and the data flow analysis on a plurality of pre-existing programs, although the use of both these aspects together is advantageous in many instances. However, each aspect can yield useful types. The union is a larger set of training data; combining both aspects generally improves on individual performance. In set theory, the union of a collection of sets is the set of all elements in the collection. The skilled artisan will be familiar with obtaining the union of sets in modern programming languages such as PYTHON. It will be appreciated that FIG. 2 relates to both the information retrieval on well-documented libraries (section 103 read_csv documentation) and the data flow analysis on a plurality of pre-existing programs (section 101 read_csv). In one or more embodiments, a knowledge graph is used to create the training set of types; the skilled artisan will be familiar with knowledge graphs per se, and, given the teachings herein, will be able to use same to implement one or more embodiments.

In view of the immediately preceding discussion, it will be appreciated that in some instances, a method for improving the technological process of programming a computer using a dynamic programming language includes generating training data which maps program variables in the dynamic programming language to corresponding functions and methods in the dynamic programming language by performing data flow analysis on a plurality of pre-existing programs written in the dynamic programming language; training a neural network on at least the training data to infer unknown types in the dynamic programming language; reducing a number of types to search during inference based on said program variable mapping; carrying out the inference with the trained neural network to infer the unknown types; and facilitating programming in the dynamic programming language based on the inferred unknown types. Any of the additional steps discussed elsewhere herein can be performed in connection with this aspect, as appropriate. This aspect can work with the results of the method that uses information retrieval or similar results obtained using some other technique.

One or more embodiments further include executing the program (e.g., in a test process by the developer and/or by an end user once released).

In one or more embodiments, performing the information retrieval includes, for each given module of a set of modules in the documentation libraries (refer to algorithm 1 lines 3-13), gathering those of the functions and the methods declared in the given module (refer to line 4). Then, for each of the gathered methods, collect a corresponding class and obtain a corresponding documentation string (see lines 5, 6, and 7), and parse each of the corresponding documentation strings into restructured text including class return values (see line 8). Furthermore, for each of the gathered functions and the methods: parse each of the corresponding documentation strings into restructured text further including function return values (see line 8), create a document for each of the functions and methods (see line 9), and index each of the documents in an index (see line 10). Yet further, for all given ones of the classes (see line 15), search the index for all of the documents corresponding to a given one of the classes (see line 16) and assign each of the documents to a corresponding function or method and type to obtain the map of the types in the dynamic programming language to the corresponding functions and methods (see lines 17-19).

The skilled artisan will appreciate that a function in PYTHON is a block of code to carry out a specific task, will contain its own scope, and is called by name; all functions may contain zero (no) arguments or more than one argument. On exit, a function may or may not return one or more values. The skilled artisan will appreciate that a method in PYTHON is somewhat similar to a function, except it is associated with object/classes. Methods in PYTHON are thus very similar to functions except for two major differences: the method is implicitly used for an object for which it is called, and the method is accessible to data that is contained within the class.

Furthermore, in PYTHON, type refers to the type of data such as text, numeric, Boolean, and the like—the type( ) function returns the class type of a given variable; a class is a code template for creating objects; and an object is a collection of data (variables) and methods/functions that act on the data.

Suitable post-processing, such as cleaning, can be carried out as appropriate (refer to exemplary discussion above).

In one or more embodiments, generating the first and second portions of training data is unsupervised.

Referring to FIGS. 21 and 22 and accompanying text, in one or more embodiments, performing the data flow analysis on the plurality of pre-existing programs written in the dynamic programming language includes: at 2202, applying static analysis to each of the programs assuming that any invocation to an imported library returns a new object of unknown type; at 2203, identifying subsequent method calls on the new object of unknown type and determining a union of all methods called on the new object of unknown type; at 2204, for each of the invocations, identifying a corresponding function; at 2205, creating a union of all methods across all of the programs on the corresponding function; at 2206, identifying those of the classes that contain all methods in the union of all methods for the corresponding function; and, at 2207, mapping the corresponding function to the identified classes. Furthermore, as at 2208, carry out the inference with the trained neural network to infer the unknown types includes applying the mapping.

In another aspect, an exemplary computer (see, e.g., FIG. 25) includes a memory 28 embodying computer executable instructions 40; and at least one processor 16, coupled to the memory, and operative by the computer executable instructions to perform any one, some, or all of the method steps described herein with regard to any of the methods described herein. For example, the at least one processor is operative to instantiate a neural network and at least one of a search engine and a static software analysis tool, depending on whether performing information retrieval on documentation libraries and/or performing data flow analysis on a plurality of pre-existing programs are to be performed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 23:
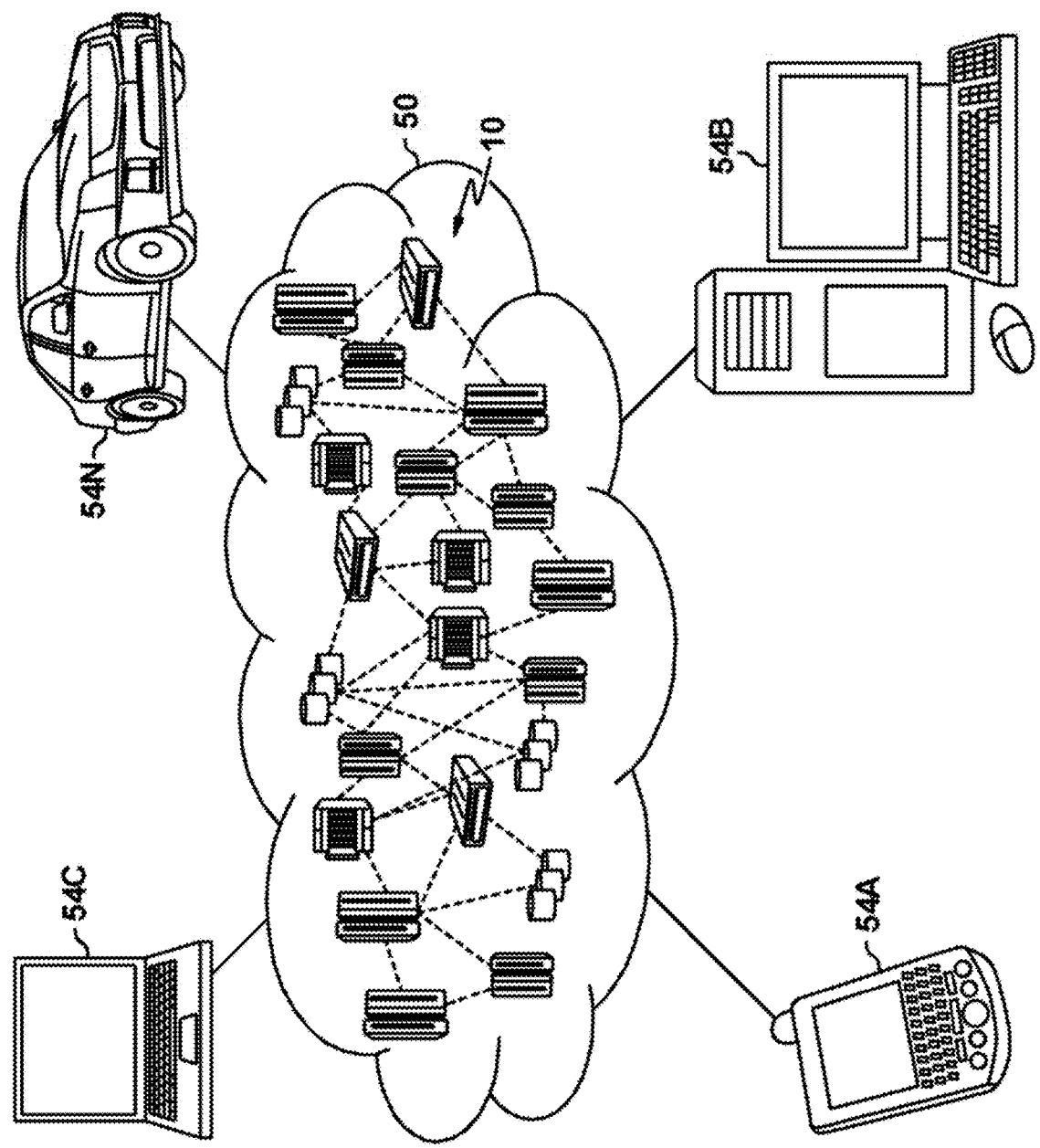
FIG. 23 depicts a cloud computing environment according to an embodiment of the present invention.

Referring now to FIG. 23, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 23 are intended to be illustrative only and that computing nodes 10 and cloud computing environment 50 can communicate with any type of computerized device over any type of network and/or network addressable connection (e.g., using a web browser).

Figure 24:
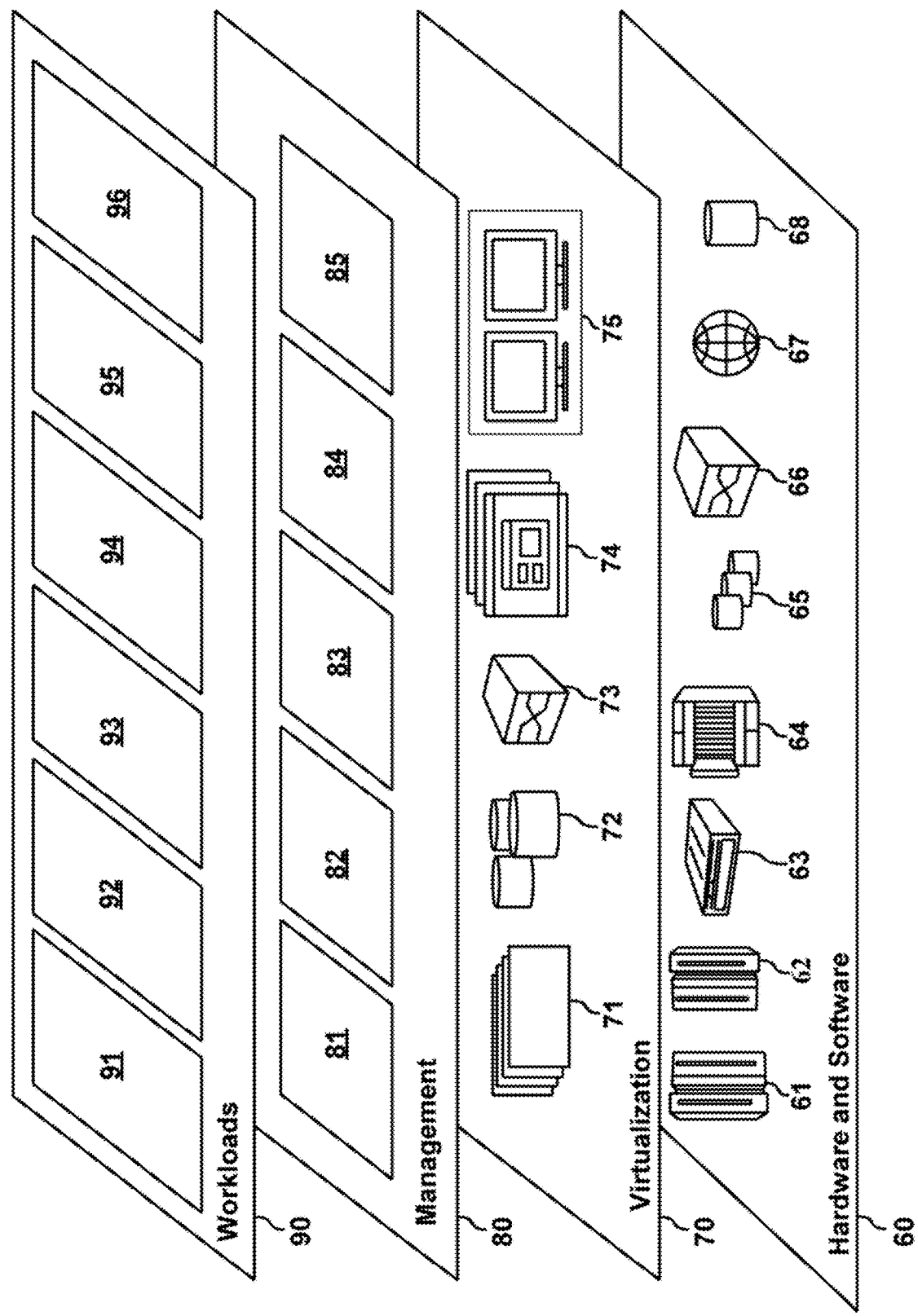
FIG. 24 depicts abstraction model layers according to an embodiment of the present invention.

Referring now to FIG. 24, a set of functional abstraction layers provided by cloud computing environment 50 (FIG. 23) is shown. It should be understood in advance that the components, layers, and functions shown in FIG. 24 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a system 96 for type inference in dynamic languages.

Figure 25:
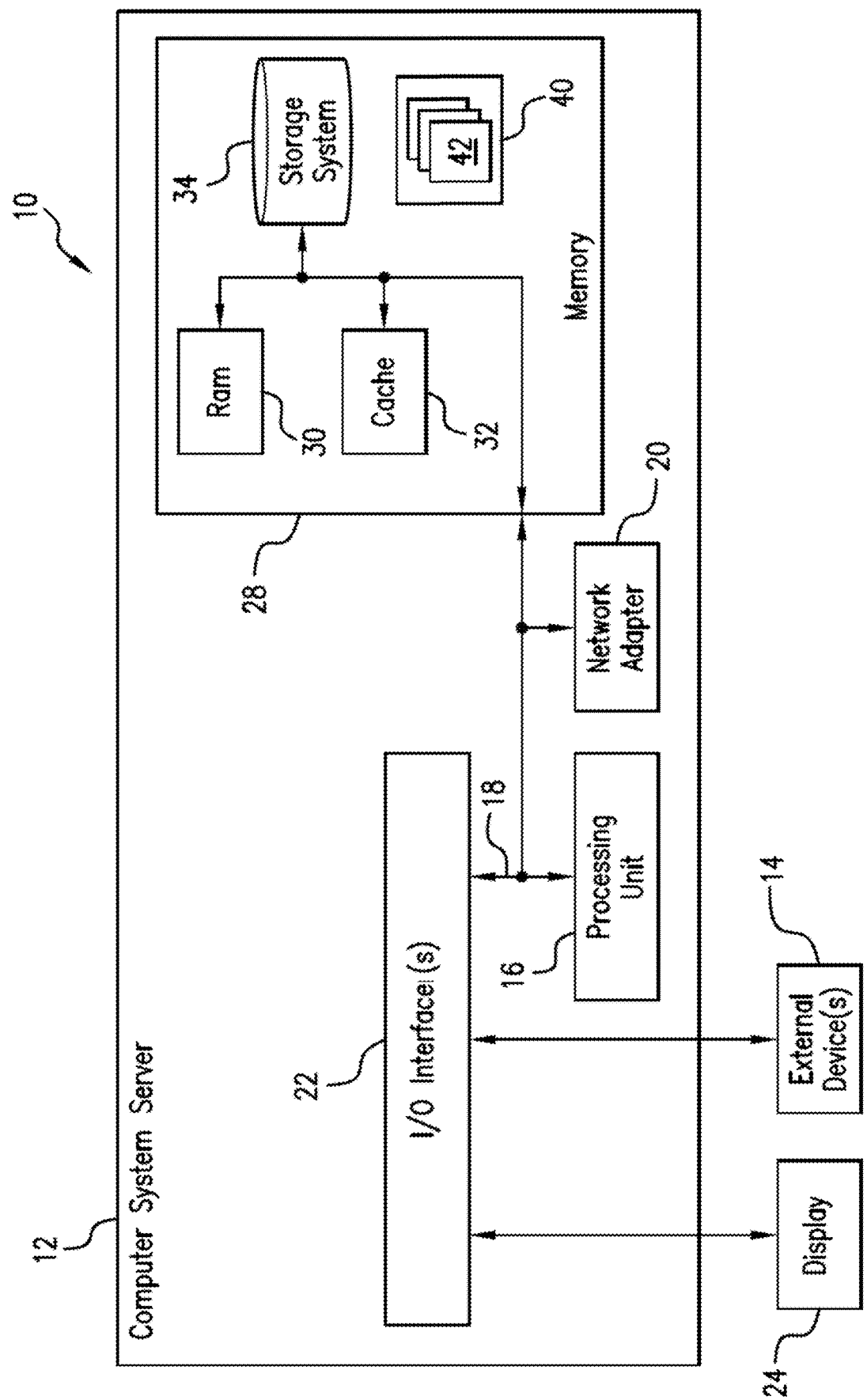
FIG. 25 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 25 depicts a computer system that may be useful in implementing one or more aspects and/or elements of the invention, also representative of a cloud computing node according to an embodiment of the present invention. Referring now to FIG. 25, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 25, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 25, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 25) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 23-24 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving the technological process of programming a computer using a dynamic programming language, comprising:
    generating a first portion of training data which maps types in said dynamic programming language to corresponding functions and methods in said dynamic programming language by performing information retrieval on documentation libraries in said dynamic programming language;
    training a neural network on said first portion of training data to infer unknown types in said dynamic programming language;
    carrying out inference with said trained neural network to infer said unknown types for program variables in a sample of code written in said dynamic programming language by inferring said unknown types based on presence of said corresponding functions and methods; and
    facilitating programming in said dynamic programming language based on said inferred unknown types.

2. The method of claim 1, further comprising:
    generating a second portion of training data which maps said program variables in said dynamic programming language to said corresponding functions and methods in said dynamic programming language by performing data flow analysis on a plurality of pre-existing programs written in said dynamic programming language; and performing a union operation on said first and second portions of training data to obtain combined training data;

wherein said training of said neural network comprises training on said combined training data to infer said unknown types in said dynamic programming language, further comprising reducing a number of said types to search during said inference based on said program variable mapping.

3. The method of claim 2, further comprising executing said program.

4. The method of claim 2, wherein performing said information retrieval comprises:

for each given module of a set of modules in said documentation libraries:
gathering those of said functions and said methods declared in said given module;
for each of said gathered methods:
collecting a corresponding class and obtaining a corresponding documentation string;
parsing each of said corresponding documentation strings into restructured text including class return values;
for each of said gathered functions and said methods:
parsing each of said corresponding documentation strings into restructured text further including function return values;
creating a document for each of said functions and methods; and
indexing each of said documents in an index;
for all given ones of said classes:
searching said index for all of said documents corresponding to a given one of said classes; and
assigning each of said documents to a corresponding function or method and type to obtain said map of said types in said dynamic programming language to said corresponding functions and methods.

5. The method of claim 2, wherein:

performing said data flow analysis on said plurality of pre-existing programs written in said dynamic programming language comprises:
applying static analysis to each of said programs assuming that any invocation to an imported library returns a new object of unknown type;
identifying subsequent method calls on said new object of unknown type;
determining a union of all methods called on said new object of unknown type;
for each of said invocations, identifying a corresponding function;
creating a union of all methods across all of said programs on said corresponding function;
identifying those of said classes that contain all methods in said union of all methods for said corresponding function; and
mapping said corresponding function to said identified classes; and
carrying out said inference with said trained neural network to infer said unknown types includes applying said mapping.

6. The method of claim 2, wherein generating said first and second portions of training data is unsupervised.

7. A computer program product comprising one or more computer readable storage media that embody computer executable instructions, which when executed by a computer cause the computer to perform a method that improves the technological process of programming the computer using a dynamic programming language, the method comprising:

generating a first portion of training data which maps types in said dynamic programming language to corresponding functions and methods in said dynamic programming language by performing information retrieval on documentation libraries in said dynamic programming language;

training a neural network on said first portion of training data to infer unknown types in said dynamic programming language;

carrying out inference with said trained neural network to infer said unknown types for program variables in a sample of code written in said dynamic programming language by inferring said unknown types based on presence of said corresponding functions and methods; and facilitating programming in said dynamic programming language based on said inferred unknown types.

8. The computer program product of claim 7, the method performed by the computer executing the instructions further comprising:

generating a second portion of training data which maps said program variables in said dynamic programming language to said corresponding functions and methods in said dynamic programming language by performing data flow analysis on a plurality of pre-existing programs written in said dynamic programming language; and performing a union operation on said first and second portions of training data to obtain combined training data;

wherein said training of said neural network comprises training on said combined training data to infer said unknown types in said dynamic programming language, further comprising reducing a number of said types to search during said inference based on said program variable mapping.

9. The computer program product of claim 8, the method performed by the computer executing the instructions further comprising executing said program.

10. The computer program product of claim 8, wherein performing said information retrieval comprises:

for each given module of a set of modules in said documentation libraries:
gathering those of said functions and said methods declared in said given module;
for each of said gathered methods:
collecting a corresponding class and obtaining a corresponding documentation string;
parsing each of said corresponding documentation strings into restructured text including class return values;
for each of said gathered functions and said methods:
parsing each of said corresponding documentation strings into restructured text further including function return values;
creating a document for each of said functions and methods; and
indexing each of said documents in an index;
for all given ones of said classes:
searching said index for all of said documents corresponding to a given one of said classes; and
assigning each of said documents to a corresponding function or method and type to obtain said map of said types in said dynamic programming language to said corresponding functions and methods.

11. The computer program product of claim 8, wherein:
performing said data flow analysis on said plurality of pre-existing programs written in said dynamic programming language comprises:
applying static analysis to each of said programs assuming that any invocation to an imported library returns a new object of unknown type;
identifying subsequent method calls on said new object of unknown type;
determining a union of all methods called on said new object of unknown type;
for each of said invocations, identifying a corresponding function;
creating a union of all methods across all of said programs on said corresponding function;
identifying those of said classes that contain all methods in said union of all methods for said corresponding function; and
mapping said corresponding function to said identified classes; and
carrying out said inference with said trained neural network to infer said unknown types includes applying said mapping.

12. The computer program product of claim 8, wherein generating said first and second portions of training data is unsupervised.

13. A computer comprising:
a memory embodying computer executable instructions; and
at least one processor, coupled to the memory, and operative by the computer executable instructions to perform a method for improving the technological process of programming the computer using a dynamic programming language, comprising:
instantiating a neural network and a search engine;
using at least said search engine, generating a first portion of training data which maps types in said dynamic programming language to corresponding functions and methods in said dynamic programming language by performing information retrieval on documentation libraries in said dynamic programming language;
training said neural network on said first portion of training data to infer unknown types in said dynamic programming language;
carrying out inference with said trained neural network to infer said unknown types for program variables in a sample of code written in said dynamic programming language by inferring said unknown types based on presence of said corresponding functions and methods; and
facilitating programming in said dynamic programming language based on said inferred unknown types.

14. The computer of claim 13, wherein said at least one processor is further operative by the computer executable instructions to:
instantiate a static software analysis tool;
using at least said static software analysis tool, generate a second portion of training data which maps said program variables in said dynamic programming language to said corresponding functions and methods in said dynamic programming language by performing data flow analysis on a plurality of pre-existing programs written in said dynamic programming language; and perform a union operation on said first and second portions of training data to obtain combined training data;
wherein said training of said neural network comprises training on said combined training data to infer said unknown types in said dynamic programming language, further comprising reducing a number of said types to search during said inference based on said program variable mapping.

15. The computer of claim 14, wherein said at least one processor is further operative by the computer executable instructions to execute said program.

16. The computer of claim 14, wherein performing said information retrieval comprises:
for each given module of a set of modules in said documentation libraries:
gathering those of said functions and said methods declared in said given module;
for each of said gathered methods:
collecting a corresponding class and obtaining a corresponding documentation string;
parsing each of said corresponding documentation strings into restructured text including class return values;
for each of said gathered functions and said methods:
parsing each of said corresponding documentation strings into restructured text further including function return values;
creating a document for each of said functions and methods; and
indexing each of said documents in an index;
for all given ones of said classes:
searching said index for all of said documents corresponding to a given one of said classes; and
assigning each of said documents to a corresponding function or method and type to obtain said map of said types in said dynamic programming language to said corresponding functions and methods.

17. The computer of claim 14, wherein:
performing said data flow analysis on said plurality of pre-existing programs written in said dynamic programming language comprises:
applying said static software analysis tool to each of said programs assuming that any invocation to an imported library returns a new object of unknown type;
identifying subsequent method calls on said new object of unknown type;
determining a union of all methods called on said new object of unknown type;
for each of said invocations, identifying a corresponding function;
creating a union of all methods across all of said programs on said corresponding function;
identifying those of said classes that contain all methods in said union of all methods for said corresponding function; and
mapping said corresponding function to said identified classes; and
carrying out said inference with said trained neural network to infer said unknown types includes applying said mapping.

18. The computer of claim 14, wherein generating said first and second portions of training data is unsupervised.

19. A method for improving the technological process of programming a computer using a dynamic programming language, comprising:

generating training data which maps program variables in said dynamic programming language to corresponding functions and methods in said dynamic programming language by performing data flow analysis on a plurality of pre-existing programs written in said dynamic programming language;
training a neural network on at least said training data to infer unknown types in said dynamic programming language;
reducing a number of types to search during inference based on said program variable mapping;
carrying out said inference with said trained neural network to infer said unknown types; and
facilitating programming in said dynamic programming language based on said inferred unknown types.

20. The method of claim 19, wherein:
performing said data flow analysis on said plurality of pre-existing programs written in said dynamic programming language comprises:
applying static analysis to each of said programs assuming that any invocation to an imported library returns a new object of unknown type;
identifying subsequent method calls on said new object of unknown type;
determining a union of all methods called on said new object of unknown type;
for each of said invocations, identifying a corresponding function;
creating a union of all methods across all of said programs on said corresponding function;
identifying those of said classes that contain all methods in said union of all methods for said corresponding function; and
mapping said corresponding function to said identified classes; and
carrying out said inference with said trained neural network to infer said unknown types includes applying said mapping.

* * * * *